United States Patent
Sugiyama (10) Patent No.: US 7,228,057 B2
(45) Date of Patent: Jun. 5, 2007

(54) APPARATUS AND METHOD OF REPRODUCING MOVING PICTURE AT VARIABLE SPEED

(75) Inventor: Kenji Sugiyama, Yokosuka (JP)

(73) Assignee: Victor Company of Japan, Ltd, Yokohama-Shi, Kanagawa-Ken (JP)

( * ) Notice: Subject to any disclaimer, the term of this patent is extended or adjusted under 35 U.S.C. 154(b) by 1242 days.

(21) Appl. No.: 10/128,268

(22) Filed: Apr. 24, 2002

(65) Prior Publication Data

US 2002/0159754 A1 Oct. 31, 2002

(30) Foreign Application Priority Data

Apr. 25, 2001 (JP) ............... 2001-127255
Mar. 26, 2002 (JP) ............... 2002-085461

(51) Int. Cl.
H04N 5/91 (2006.01)
H04N 7/01 (2006.01)
H04N 9/00 (2006.01)
H04N 11/20 (2006.01)

(52) U.S. Cl. .................... 386/68; 386/131; 386/1; 348/448; 348/458

(58) Field of Classification Search ........... 386/1, 386/131, 68; 348/448, 458
See application file for complete search history.

(56) References Cited

U.S. PATENT DOCUMENTS

| | | | |
|---|---|---|---|
| 6,380,979 B1 * | 4/2002 | Tokoi et al. | 348/458 |
| 6,392,706 B1 * | 5/2002 | Sugiyama | 348/458 |
| 6,778,758 B1 * | 8/2004 | Endo et al. | 386/95 |
| 2001/0008577 A1 * | 7/2001 | Yamada et al. | 386/98 |
| 2001/0016107 A1 * | 8/2001 | Itani et al. | 386/46 |

FOREIGN PATENT DOCUMENTS

| | | |
|---|---|---|
| EP | 0542259 A1 * | 5/1993 |
| JP | 05-137122 | 6/1993 |
| JP | 05-344494 | 12/1993 |
| JP | 06-261297 | 9/1994 |
| JP | 07-203375 | 8/1995 |
| JP | 09/294249 | 11/1997 |
| JP | 10-150645 | 6/1998 |
| JP | 11-308573 | 11/1999 |
| JP | 2000-101974 | 4/2000 |
| JP | 2000-115722 | 4/2000 |
| JP | 2001-202698 | 7/2001 |
| JP | 2002-064791 | 2/2002 |

* cited by examiner

*Primary Examiner*—Thai Q. Tran
*Assistant Examiner*—Daquan Zhao
(74) *Attorney, Agent, or Firm*—Jacobson Holman PLLC (57) ABSTRACT

Moving pictures are reproduced from a stored moving-picture signal and output at a set reproduction speed. The stored moving-picture signal is reproduced in accordance with the set reproduction speed to obtain first interlaced pictures. The first interlaced pictures are converted to obtain first progressive pictures. Moving pictures to be displayed are selected from the first progressive pictures per frame in accordance with the set reproduction speed to obtain second progressive pictures. Scanning lines of the second progressive pictures are decimated so that the number of remaining scanning lines of the second progressive pictures after decimation is equal to the number of scanning lines of interlaced pictures to be displayed, thus outputting second interlaced pictures. The first interlaced pictures are output when the set reproduction speed is the first reproduction speed whereas the second interlaced pictures are output when the set reproduction speed is the second reproduction speed.

2 Claims, 6 Drawing Sheets

APPARATUS AND METHOD OF REPRODUCING MOVING PICTURE AT VARIABLE SPEED

BACKGROUND OF THE INVENTION

The present invention relates to an apparatus and a method of reproducing moving pictures at a regular or a different reproduction speed. Particularly, this invention relates to an apparatus and a method of reproducing moving pictures as interlaced pictures at a variable speed.

Moving pictures are reproduced from storage media such as magnetic tapes and video discs at a regular reproduction speed that matches a rate of motion of the moving pictures or a variable speed.

Variable-speed reproduction includes reproduction at slow speeds such as still-picture reproduction and slow-motion reproduction in the range from 1/10 to 1/2× speed and also at high speeds such as 2× speed and frame search in the range from 5 to 50× speed. Reproduction at a speed, for example, two times higher than a regular speed is termed as 2× speed reproduction hereinafter.

One requirement of such variable-speed reproduction is to produce pictures the same as the regular-speed reproduction in quality. Therefore, slow-speed reproduction reproduces a picture twice or more in succession in accordance with a reproduction speed whereas high-speed reproduction decimates pictures in accordance with a reproduction speed to achieve the same picture rate, for example, 60 fields per second.

Each field exists per 1/60 seconds and even and odd fields are arranged alternately for moving pictures formed by interlaced scanning at the picture rate of 60 fields per second. This alternate field arrangements gives a normal relationship (parity) between the even and odd fields.

The normal parity will be often destroyed at variable-speed reproduction due to generation of a field twice or more in succession or field decimation, resulting in displaying reverse-parity fields.

Generation of reverse-parity fields will be discussed in detail.

A moving-picture signal is retrieved from a storage-medium at a retrieval speed in accordance with a reproduction speed.

In regular-speed reproduction, the retrieved moving-picture signal is reproduced as interlaced pictures and field pictures of regular interlaced pictures are output from the reproduced interlaced pictures in synchronism with output-format interlaced pictures.

In high-speed reproduction, however, some pictures are only reproduced from the retrieved moving-picture signal and decimated per field.

On the contrary, slow-motion reproduction reproduces all pictures from the retrieved moving-picture signal and outputs a field twice or more in succession at a speed in accordance with a reproduction speed slower than an actual picture speed.

Figure 1:
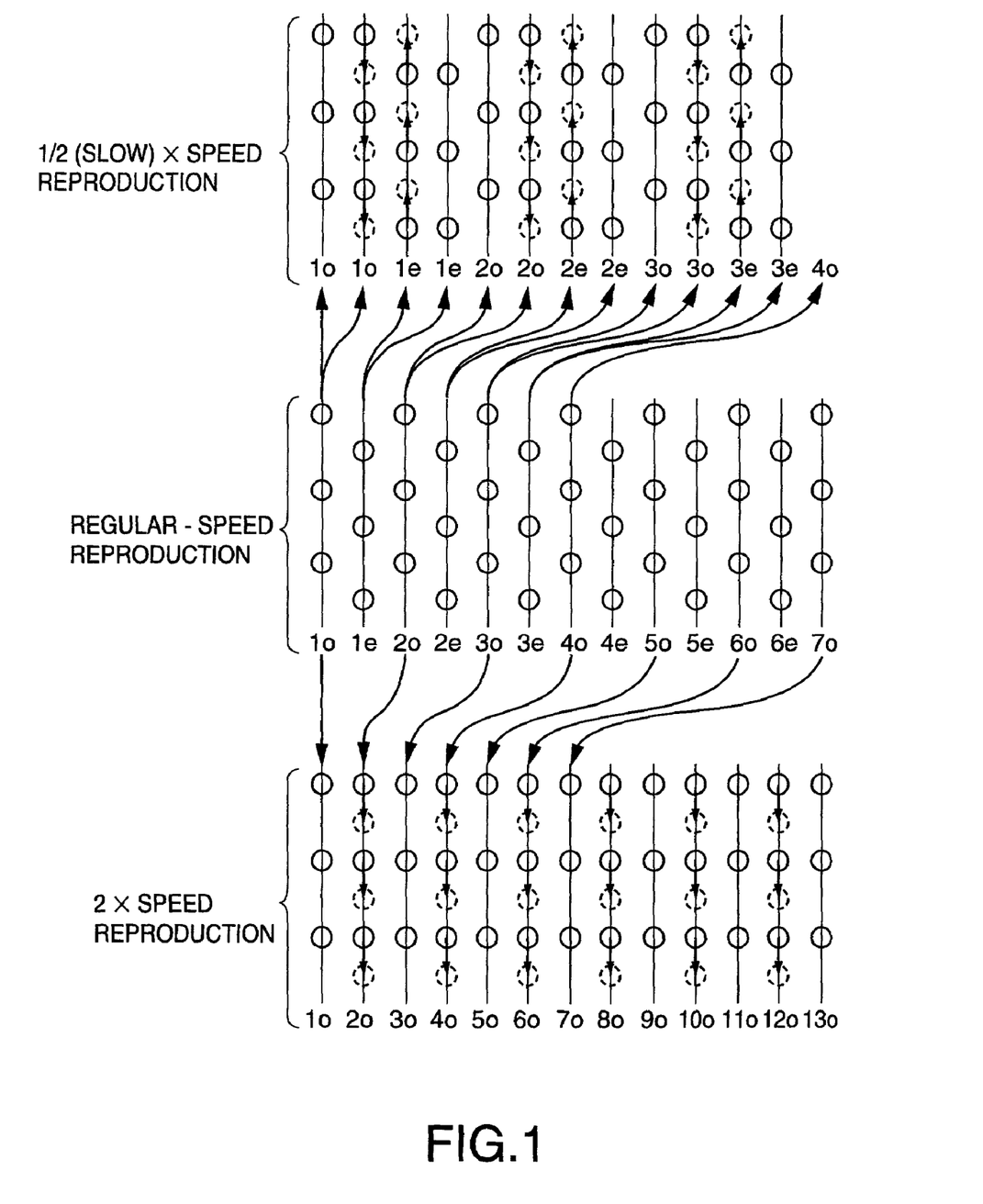
FIG. 1 illustrates change in scanning lines in conventional variable-speed reproduction.

FIG. 1 illustrates scanning lines in 1/2 and 2× speed reproduction in relation to regular-speed reproduction.

In FIG. 1, dot-line circles indicate scanning lines located at positions different from regular scanning lines at regular-speed reproduction. The regular scanning lines are indicated by circles. Their vertical positional replacements are indicated by arrows.

The dot-line-circle scanning lines in both high-speed reproduction and slow-motion reproduction have a reverse parity with the regular scanning lines at half fields.

Odd-times speed reproduction such as 3×, 5× and 7× speed reproduction have a normal parity but reproduce some picture components only due to inferior decoding performance, thus resulting in inappropriate filed pictures.

The reverse parity for interlaced pictures discussed above causes low image resolution, aliasing (image degradation with stepped oblique lines, etc) and vertical image vibration.

Reproduction-speed settings only for normal parity highly restrict the range of reproduction speed.

SUMMARY OF THE INVENTION

A purpose of the present invention is to provide an apparatus and a method of reproducing normal-parity interlaced moving pictures at any speed different from a regular reproduction speed.

The present invention provides an apparatus for reproducing moving pictures from a stored moving-picture signal and outputting the moving pictures at a set reproduction speed that is a first reproduction speed matching a rate of motion of the moving pictures or a second reproduction speed different from the first reproduction speed, the apparatus including: a reproducer to reproduce the stored moving-picture signal in accordance with the set reproduction speed for obtaining first interlaced pictures; a progressive scanning converter to convert the first interlaced pictures for obtaining first progressive pictures; a picture selector to select moving pictures to be displayed from the first progressive pictures per frame in accordance with the set reproduction speed for obtaining second progressive pictures; and a scanning-line decimator to decimate scanning lines of the second progressive pictures so that the number of remaining scanning lines of the second progressive pictures after decimation is equal to the number of scanning lines of interlaced pictures to be displayed, thus outputting second interlaced pictures, wherein the first interlaced pictures are output when the set reproduction speed is the first reproduction speed whereas the second interlaced pictures are output when the set reproduction speed is the second reproduction speed.

Moreover, the present invention provides an apparatus for reproducing moving pictures from a stored moving-picture signal and outputting the moving pictures at a set reproduction speed that is a first reproduction speed matching a rate of motion of the moving pictures or a second reproduction speed different from the first reproduction speed, the apparatus including: a reproducer to reproduce the stored moving-picture signal in accordance with the set reproduction speed for obtaining first interlaced pictures; a scanning-line interpolator to generate scanning lines on positions corresponding to scanning lines lost from the first interlaced pictures due to interlaced scanning for obtaining interpolated interlaced pictures having the generated scanning lines; and a picture selector to select moving pictures to be displayed from the first interlaced pictures or the interpolated interlaced pictures per field in accordance with scanning lines of interlaced pictures to be displayed and the set reproduction speed for obtaining second interlaced pictures, wherein the first interlaced pictures are output when the set reproduction speed is the first reproduction speed whereas the second interlaced pictures are output when the set reproduction speed is the second reproduction speed.

Furthermore, the present invention provides an apparatus for reproducing moving pictures from a stored moving-picture signal and outputting the moving pictures at a set reproduction speed that is a first reproduction speed matching a rate of motion of the moving pictures or a second reproduction speed different from the first reproduction speed, the stored moving-picture signal being reproducible by interlaced and progressive scanning, the apparatus including: a reproducer to reproduce the stored moving-picture signal in accordance with the set reproduction speed to obtain first interlaced pictures when the set reproduction speed is the first reproduction speed whereas obtain first progressive pictures when the set reproduction speed is the second reproduction speed; a first picture selector to select moving pictures to be displayed from the first progressive pictures per frame in accordance with the set reproduction speed for obtaining second progressive pictures; a scanning-line decimator to decimate scanning lines of the second progressive pictures so that the number of remaining scanning lines of the second progressive pictures after decimation is equal to the number of scanning lines of interlaced pictures to be displayed, thus outputting second interlaced pictures; and a second picture selector to select the first interlaced pictures when the set reproduction speed is the first reproduction speed whereas select the second interlaced pictures when the set reproduction speed is the second reproduction speed, thus outputting the selected interlaced pictures.

Moreover, the present invention provides a method of reproducing moving pictures from a stored moving-picture signal and outputting the moving pictures at a set reproduction speed that is a first reproduction speed matching a rate of motion of the moving pictures or a second reproduction speed different from the first reproduction speed, the method including steps of: reproducing the stored moving-picture signal in accordance with the set reproduction speed for obtaining first interlaced pictures; converting the first interlaced pictures for obtaining first progressive pictures; selecting moving pictures to be displayed from the first progressive pictures per frame in accordance with the set reproduction speed for obtaining second progressive pictures; decimating scanning lines of the second progressive pictures so that the number of remaining scanning lines of the second progressive pictures after decimation is equal to the number of scanning lines of interlaced pictures to be displayed, thus outputting second interlaced pictures; and outputting the first interlaced pictures when the set reproduction speed is the first reproduction speed whereas outputting the second interlaced pictures when the set reproduction speed is the second reproduction speed.

Furthermore, the present invention provides a method of reproducing moving pictures from a stored moving-picture signal and outputting the moving pictures at a set reproduction speed that is a first reproduction speed matching a rate of motion of the moving pictures or a second reproduction speed different from the first reproduction speed, the method including the steps of: reproducing the stored moving-picture signal in accordance with the set reproduction speed for obtaining first interlaced pictures; generating scanning lines on positions corresponding to scanning lines lost from the first interlaced pictures due to interlaced scanning for obtaining interpolated interlaced pictures having the generated scanning lines; selecting moving pictures to be displayed from the first interlaced pictures or the interpolated interlaced pictures per field in accordance with scanning lines of interlaced pictures to be displayed and the set reproduction speed for obtaining second interlaced pictures; and outputting the first interlaced pictures when the set reproduction speed is the first reproduction speed whereas outputting the second interlaced pictures when the set reproduction speed is the second reproduction speed.

Still furthermore, the present invention provides a method of reproducing moving pictures from a stored moving-picture signal and outputting the moving pictures at a set reproduction speed that is a first reproduction speed matching a rate of motion of the moving pictures or a second reproduction speed different from the first reproduction speed, the stored moving-picture signal being reproducible by interlaced and progressive scanning, the method including the steps of: reproducing the stored moving-picture signal in accordance with the set reproduction speed to obtain first interlaced pictures when the set reproduction speed is the first reproduction speed whereas obtain first progressive pictures when the set reproduction speed is the second reproduction speed; selecting moving pictures to be displayed from the first progressive pictures per frame in accordance with the set reproduction speed for obtaining second progressive pictures; decimating scanning lines of the second progressive pictures so that the number of remaining scanning lines of the second progressive pictures after decimation is equal to the number of scanning lines of interlaced pictures to be displayed, thus outputting second interlaced pictures; and selecting the first interlaced pictures when the set reproduction speed is the first reproduction speed whereas selecting the second interlaced pictures when the set reproduction speed is the second reproduction speed, thus outputting the selected interlaced pictures.

Still furthermore, the present invention provides an apparatus for reproducing moving pictures from a stored progressive moving-picture signal having a first specific number of scanning lines and outputting interlaced moving pictures to be displayed at a set reproduction speed different from a reproduction speed matching a rate of motion of the moving pictures, the apparatus including: a picture reproducer to reproduce the stored moving-picture signal in accordance with the set reproduction speed for obtaining first progressive pictures having the first specific number of scanning lines; a picture selector to select moving pictures to be displayed from the first progressive pictures per frame in accordance with the set reproduction speed for obtaining second progressive pictures; a scanning-line converter to convert the first specific number of scanning lines of the second progressive pictures to a second specific number of scanning lines of the interlaced pictures to be displayed for obtaining third progressive pictures having the second specific scanning lines to be displayed; and a scanning-line decimator to decimate the second specific number of scanning lines of the third progressive pictures for obtaining and outputting the interlaced moving pictures to be displayed having the second specific number of scanning lines.

Still furthermore, the present invention provides an apparatus for reproducing moving pictures from a stored progressive moving-picture signal having a specific number of scanning lines and outputting interlaced moving pictures to be displayed at a set reproduction speed different from a reproduction speed matching a rate of motion of the moving pictures, the apparatus including: a picture reproducer to reproduce the stored moving-picture signal in accordance with the set reproduction speed for obtaining first progressive pictures having the specific number of scanning lines; a first picture selector to select moving pictures to be displayed from the first progressive pictures per frame in accordance with the set reproduction speed for obtaining second progressive pictures; a first scanning-line converter to convert the second progressive pictures into odd fields of the interlaced moving pictures to be displayed; a second scanning-line converter to convert the second progressive pictures into even fields of the interlaced moving pictures to be displayed; and a second picture selector to alternately select the odd and even fields for obtaining and outputting the interlaced moving pictures to be displayed.

Still furthermore, the present invention provides a method of reproducing moving pictures from a stored progressive moving-picture signal having a first specific number of scanning lines and outputting interlaced moving pictures to be displayed at a set reproduction speed different from a reproduction speed matching a rate of motion of the moving pictures, the method including the steps of: reproducing the stored moving-picture signal in accordance with the set reproduction speed for obtaining first progressive pictures having the first specific number of scanning lines; selecting moving pictures to be displayed from the first progressive pictures per frame in accordance with the set reproduction speed for obtaining second progressive pictures; converting the first specific number of scanning lines of the second progressive pictures to a second specific number of scanning lines of the interlaced pictures to be displayed for obtaining third progressive pictures having the second specific scanning lines to be displayed; and decimating the second specific number of scanning lines of the third progressive pictures for obtaining and outputting the interlaced moving pictures to be displayed having the second specific number of scanning lines.

Still furthermore, the present invention provides a method of reproducing moving pictures from a stored progressive moving-picture signal having a specific number of scanning lines and outputting interlaced moving pictures to be displayed at a set reproduction speed different from a reproduction speed matching a rate of motion of the moving pictures, the method comprising the steps of: reproducing the stored moving-picture signal in accordance with the set reproduction speed for obtaining first progressive pictures having the specific number of scanning lines; selecting moving pictures to be displayed from the first progressive pictures per frame in accordance with the set reproduction speed for obtaining second progressive pictures; converting the second progressive pictures into odd fields of the interlaced moving pictures to be displayed; converting the second progressive pictures into even fields of the interlaced moving pictures to be displayed; and alternately selecting the odd and even fields for obtaining and outputting the interlaced moving pictures to be displayed.

DETAILED DESCRIPTION OF PREFERRED EMBODIMENTS

Preferred embodiments according to the present invention will be disclosed with reference to the attached drawings.

(First Concept/First, Second and Third Embodiments)

A first concept of the present invention for a first, a second and a third embodiment disclosed later is as follows:

Progressive moving pictures (or progressive-equivalent moving pictures) are reproduced from a recorded moving-picture signal.

The progressive moving pictures carry even and odd fields of interlace pictures. Conversion of the progressive moving pictures in accordance with an output interlaced-picture format thus achieves a normal parity for output interlaced pictures at any reproduction speed (variable-speed reproduction) different from a regular reproduction speed that matches a rate of motion of the recorded moving pictures.

Reproduction at the regular reproduction speed delivers interlaced moving pictures with no such progressive conversion (regular-speed reproduction).

First Embodiment

Figure 2:
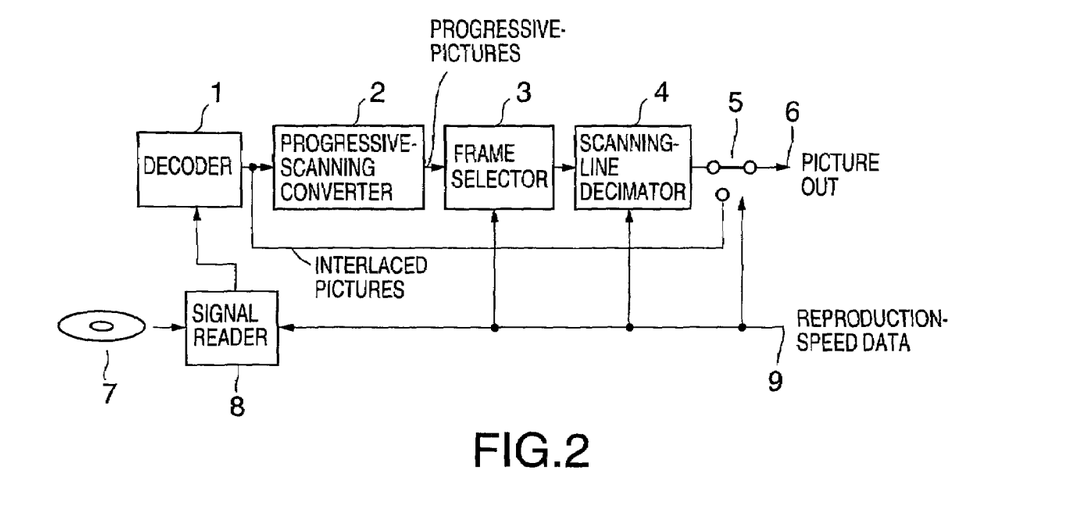
FIG. 2 is a block diagram of a first embodiment of variable-speed reproduction apparatus according to the present invention.

The first embodiment of variable-speed reproduction apparatus according to the present invention is disclosed with reference FIG. 2.

Speed data on reproduction speed is supplied, via a terminal 9, to a signal reader 8, a frame selector 3 and a picture switch 5.

The reproduction speed is within the range covering still-picture reproduction, slow-motion (1/10 to 1/2× speed) reproduction, a regular-speed (1× speed) reproduction, 2× speed reproduction and high-speed search (5× to 50× speed). These speeds are available for both forward and backward reproduction. Picture edition is available at 1/2 to 2× speed with several % variation allowable from the regular speed for edition-time adjustments.

A moving-picture signal stored in a storage medium 7 carries interlaced pictures, which may be an NTSC signal or a digital signal such as a 480i- or 1080i-digital moving-picture signal. The picture rate for the moving-picture signal is 60 fps (filed per second). It may, however, be 50 fps for example. The moving-picture signal may be an analog signal, a non-compressed digital signal, an intraframe bitstream or an MPEG-2 interframe bitstream.

In operation, the moving-picture signal stored in the storage medium 7 is retrieved by the signal reader 8. The moving-picture signal is subjected to error correction, etc., and its moving-picture bitstream is supplied to a decoder The decoder 1 applies a decoding procedure to the moving-picture bitstream in accordance with a picture format at the time of being recorded in the storage medium 7, to reproduce interlaced moving pictures.

The interlaced moving pictures are supplied to a progressive-scanning converter 2 and the picture switch 5.

In the regular-speed (1× speed) reproduction, the interlaced moving pictures are output from an output terminal 6 via the picture switch 5. The picture switch 5 may be eliminated with arrangements to the progressive-scanning converter 2, the frame selector 3 and a scanning-line decimator 4 (described later) such that they are able to pass the interlaced moving pictures.

The decoder 1 and the signal reader 8 are available for reproduction up to 2× speed reproduction in this embodiment. In detail, all pictures are decoded through these devices at speed up to 2 times the regular-reproduction speed but some picture frames only at speed higher than 2× speed, for example, I (intra-coded)- and P (predictive-coded)-pictures only or I-pictures only for MPEG signals.

In the variable-speed reproduction, the interlaced pictures reproduced through the decoder 1 is subjected to scanning-line interpolation at the progressive-scanning converter 2, to be converted into progressive pictures.

Precise motion-compensated interpolation at the progressive-scanning converter 2 will deliver high quality progressive pictures.

The progressive pictures are supplied to the frame selector 3. At least one picture frame of the progressive pictures is held at the frame selector 3 for frame synchronization. The frame selector 3 selects a frame of the progressive pictures twice or more in succession when the reproduction speed set in accordance with the reproduction-speed data supplied via the terminal 9 is slower than the regular reproduction speed. On the contrary, the frame selector 3 selects specific frames while decimating several frames of the progressive pictures when the reproduction speed set in accordance with the reproduction-speed data is higher than the regular speed.

The selected frames of the progressive pictures are supplied to the scanning-line decimator 4. Several number of scanning lines of the selected frames are decimated in synchronism with an interlaced-picture format to be displayed. The scanning-line-decimated frames are output as interlaced pictures via the switch 5 at the variable-speed reproduction in accordance with the reproduction-speed data.

Figure 3:
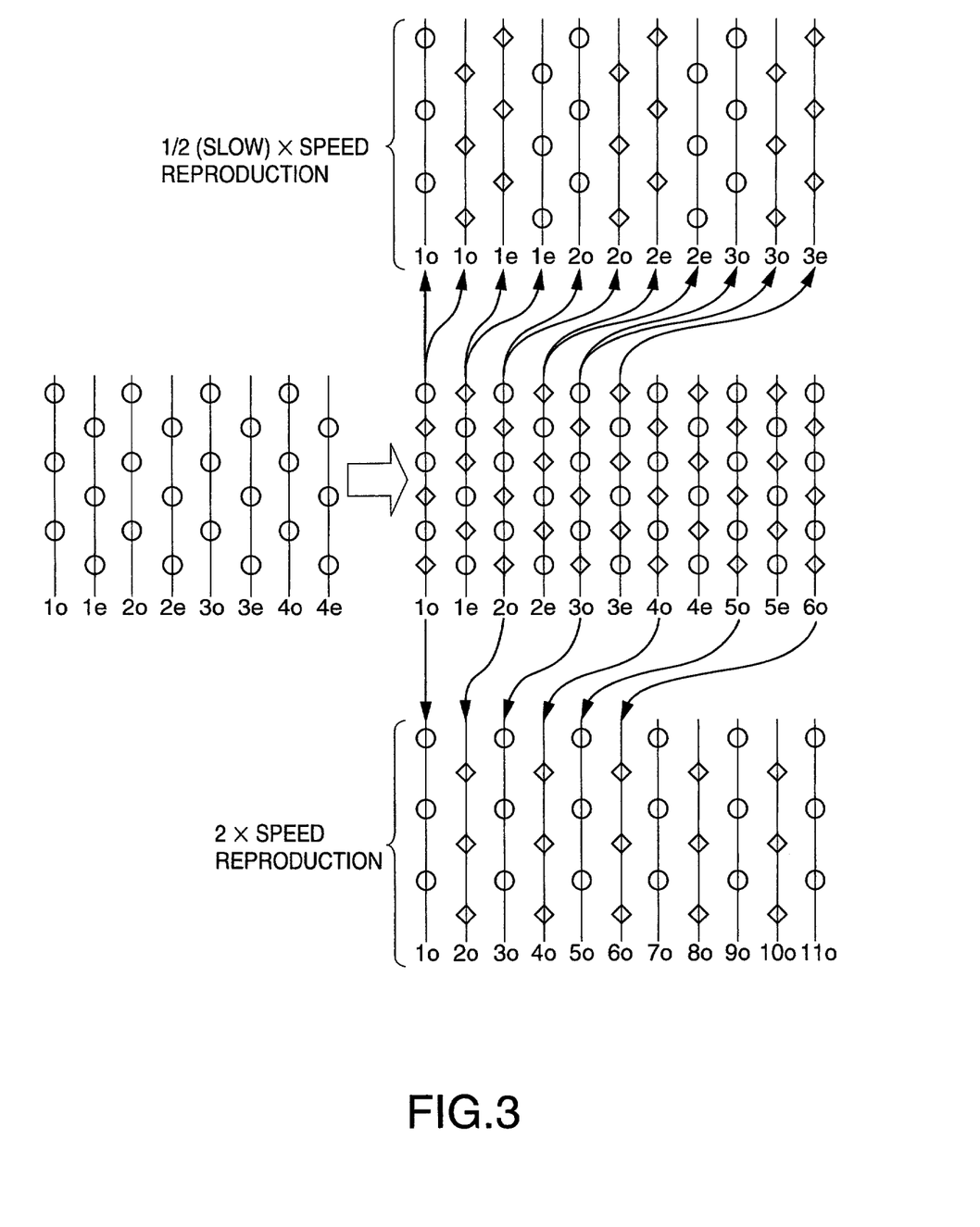
FIG. 3 illustrates change in scanning lines in variable-speed reproduction according to the first embodiment of the present invention.

Illustrated in FIG. 3 is change in the number of scanning lines at the variable-speed reproduction in this embodiment. The mark "○" indicates the scanning lines of the interlaced pictures supplied to the progressive-scanning converter 2. The mark "◊" indicates the interpolated scanning lines of the interlaced pictures by the progressive-scanning converter 2.

Frame selection at the frame selector 3 is performed such that a frame of the progressive pictures from the progressive-scanning converter 2 is selected twice or more in succession at the set speed slower than the regular reproduction speed whereas several frames of the progressive pictures are decimated at the set speed higher than the regular speed.

For example, one frame is selected twice in succession at ½× speed reproduction whereas one of two consecutive frames is selected at 2× speed reproduction.

The scanning lines of the selected progressive frames are decimated by the scanning-line decimator 4 at a constant interval in accordance with an output picture format. The scanning-line-decimated frames are output via the switch 5 as interlaced pictures. For example, even and odd fields are alternately output for each fame at ½× speed reproduction whereas even fields are interpolated for each output frame at 2× speed reproduction.

As disclosed above, the first embodiment achieves variable-speed reproduction with a normal parity for output interlaced pictures with almost no picture degradation such as low image resolution, aliasing and vertical image vibration.

Second Embodiment

Figure 4:
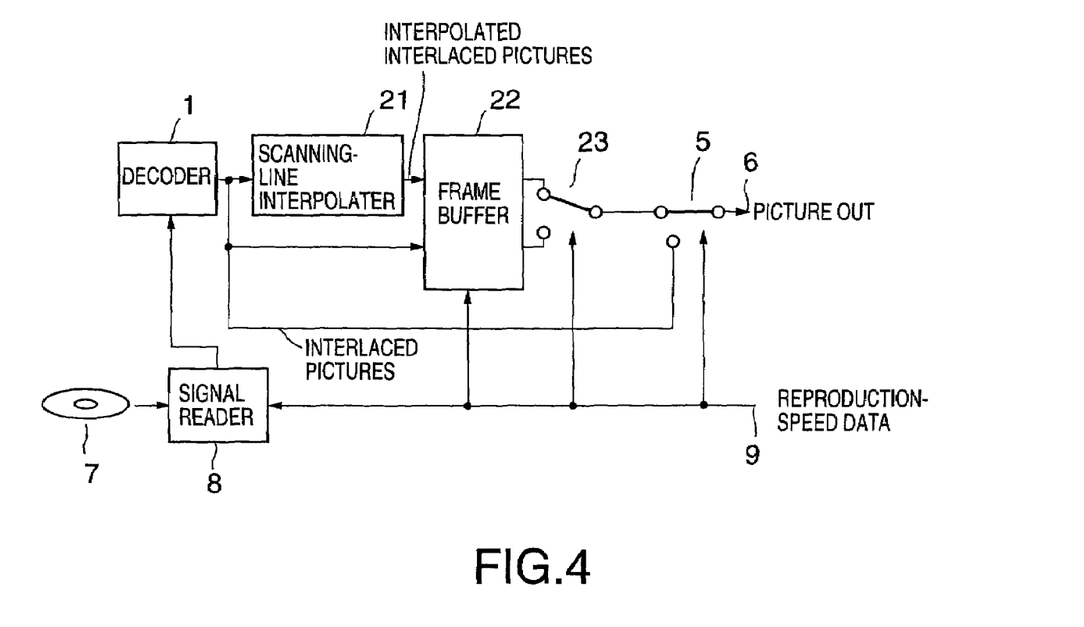
FIG. 4 is a block diagram of a second embodiment of variable-speed reproduction apparatus according to the present invention.

Disclosed next with reference to FIG. 4 is the second embodiment of variable-speed reproduction apparatus according to the present invention.

Elements in this embodiment that are the same as or analogous to the elements in the first embodiment are referenced by the same reference numbers and will not be explained in detail.

The variable-speed reproduction apparatus in the second embodiment is equipped with a scanning-line interpolator 21 instead of the progressive-scanning converter 2 (FIG. 2) and a frame buffer 22 and a switch 23 instead of the frame selector 3 and the scanning-line decimator 4 (FIG. 2).

The difference in operation of the second embodiment from the first embodiment is to handle recorded pictures and interpolation pictures in parallel with no producing perfect progressive pictures.

Interlaced pictures reproduced from the storage medium 7 via the signal reader 8 and the decoder 1 is supplied to the scanning-line interpolator 21, the frame buffer 22 and the switch 23.

On receiving the interlaced pictures, the scanning-line interpolator 21 generates scanning lines corresponding to those at the positions of the interlaced pictures from which scanning lines have been decimated due to interlaced scanning, to output interpolated interlaced pictures. This procedure is equivalent to one of the operations of the progress-scanning converter 2 in the first embodiment (FIG. 2).

The interpolated interlaced pictures are supplied to the frame buffer 22. The interlaced pictures from the decoder 1 and the interpolated interlaced pictures from the scanning-line interpolator 21 are held at the frame buffer 22. The interlaced pictures and the interpolated interlaced pictures have a reverse parity with each other.

The switch 23 selects either the interlaced pictures or the interpolated interlaced pictures that match the output picture format. Through the operation of the frame buffer 22 and the switch 23, moving pictures to be displayed are selected from the interlaced pictures or the interpolated interlaced pictures per field in accordance with scanning lines for the output picture format and a set reproduction speed supplied via the terminal 9, thus generating interlaced pictures to be displayed.

The generated interlaced pictures are supplied to the switch 5. The switch 5 selects the interlaced pictures from the switch 23 in accordance with the reproduction-speed data in the variable-speed reproduction. On the contrary, the switch 5 selects the interlaced pictures from the decoder 1 in the regular-speed (1× speed) reproduction.

As disclosed above, the second embodiment also achieves variable-speed reproduction with a normal parity for output interlaced pictures almost no picture degradation such as low image resolution, aliasing and vertical image vibration.

Third Embodiment

Figure 5:
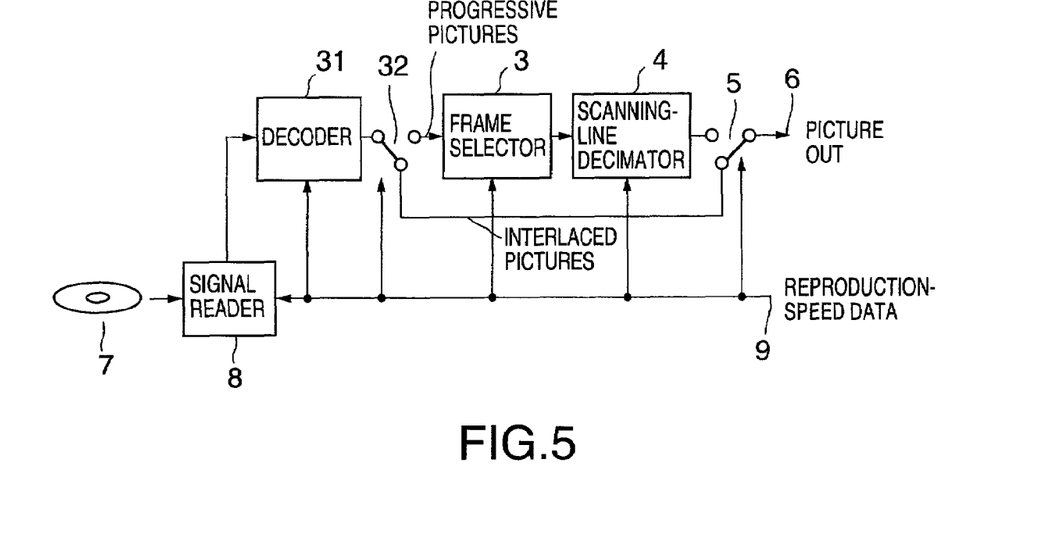
FIG. 5 is a block diagram of a third embodiment of variable-speed reproduction apparatus according to the present invention.

Disclosed next with reference to FIG. 5 is the third embodiment of variable-speed reproduction apparatus according to the present invention.

Elements in this embodiment that are the same as or analogous to the elements in the first embodiment are referenced by the same reference numbers and will not be explained in detail.

The variable-speed reproduction apparatus in the third embodiment does not require the progressive-scanning converter 2 (FIG. 1). A decoder 31 in the third embodiment is different from the decoder 1 (FIG. 1) in operation.

The difference in operation of the third embodiment from the first embodiment is to generate progressive pictures at the decoder 31, which are supplied to the frame selector 3 via a switch 32.

The decoder 31 and the switch 32 operate as disclosed below in accordance with reproduction-speed data supplied via the terminal 9.

The decoder 31 generates both interlaced and progressive pictures by switching the decoding procedure to a specific type of bitstream supplied from the signal reader 8. The bitstream to be subjected to the decoding procedure may be an MPEG bitstream carrying I- and P-pictures coded under progressive scanning and also B (bidirectionally predictive-coded)-pictures coded under interlaced scanning. An encoder for producing such a bitsteam and the decoder 31 are disclosed in Japanese Unexamined Patent Publication No. 11-46365/1999.

The third embodiment also achieves variable-speed reproduction with a normal parity for output interlaced pictures with almost no picture degradation such as low image resolution, aliasing and vertical image vibration.

(Second Concept/Fourth and Fifth Embodiments)

A second concept of the present invention for a fourth and a fifth embodiment disclosed later is as follows:

Progressive moving pictures are reproduced from a recorded moving-picture signal carrying progressive moving pictures. The number of scanning lines of the reproduced progressive moving pictures is converted to be equal to the number of scanning lines for an output interlaced-picture format to be displayed if different, for obtaining final interlaced pictures to be displayed at any reproduction speed (variable-speed reproduction) different from a regular reproduction speed that matches a rate of motion of the recorded moving pictures.

Conversion of the number of scanning lines is applied to progressive moving pictures, thus causing no problems such as reversion of even and odd fields for interlaced moving pictures.

The scanning-line-converted progressive pictures to be displayed carries even and odd fields of interlaced moving pictures. The final interlaced pictures to be displayed obtained from the scanning-line-converted progressive pictures posses a normal parity at any speed in variable-speed reproduction.

Fourth Embodiment

Figure 6:
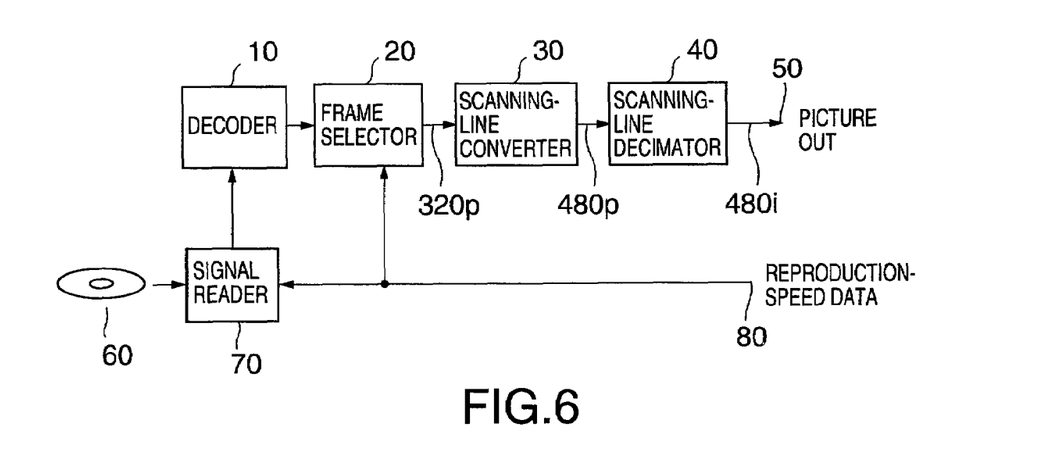
FIG. 6 is a block diagram of a fourth embodiment of variable-speed reproduction apparatus according to the present invention.

The fourth embodiment of variable-speed reproduction apparatus according to the present invention is disclosed with reference FIG. 6.

Speed data on reproduction speed is supplied, via a terminal 80, to a signal reader 70 and a frame selector 20.

The reproduction speed is also within the range covering still-picture reproduction, slow-motion ($1/10$ to $1/2 \times$ speed) reproduction, a regular-speed (1× speed) reproduction, 2× speed reproduction and high-speed search (5× to 50× speed). These speeds are available for both forward and backward reproduction. Picture edition is available at ½ to 2× speed with a 10% variation allowable from the regular speed for edition-time adjustments.

A moving-picture signal stored in a storage medium 60 carries progressive pictures with 320 scanning lines. The number of scanning lines may be 360 or 720 instead of 320. The picture rate for the moving-picture signal is 60 fps. It may, however, be 30, 24 or 50 fps for example. The moving-picture signal may be an analog signal, a non-compressed digital signal, an intraframe bitstream or an MPEG-2 interframe bitstream.

In operation, the moving-picture signal stored in the storage medium 60 is retrieved by the signal reader 70. The moving-picture signal is subjected to error correction, etc., and its moving-picture bitstream is supplied to a decoder 10.

The decoder 10 applies a decoding procedure to the moving-picture bitstream in accordance with a picture format at the time of being recorded in the storage medium 60, to reproduce progressive moving pictures.

The progressive moving pictures are supplied to the frame selector 20. At least one picture frame of the progressive pictures is held at the frame selector 20 for frame synchronization.

The progressive moving pictures pass through the frame selector 20 with no processing at the regular speed (1× speed)-reproduction.

The frame selector 20 selects progressive moving pictures per frame in accordance with a set reproduction speed in variable-speed reproduction. In detail, The frame selector 20 selects a frame of the progressive pictures twice or more in succession when the reproduction speed set in accordance with the reproduction-speed data supplied via the terminal 80 is slower than the regular reproduction speed. On the contrary, the frame selector 20 selects specific frames while decimating several frames of the progressive pictures when the reproduction speed set in accordance with the reproduction-speed data is higher than the regular speed.

The selected progressive pictures are supplied to a scanning-line converter 30 for conversion of the number of scanning lines from 320 (320p) to 480 (480p) per frame. The scanning-line conversion is a resampling procedure to increase the number of scanning lines 1.5 times the input scanning lines. The scanning-line converter 30 has a resampling filter that generates new scanning lines from several scanning lines of an input frame in accordance with a specific conversion ratio.

The progressive pictures converted into 480 scanning lines (progressive pictures having scanning lines to be displayed) are supplied to a scanning-line decimator 40. Several number of scanning lines of the converted progressive pictures are decimated in synchronism with an interlaced-picture format to be displayed, thus obtaining interlaced pictures to be displayed having 480 (480i) scanning lines.

The interlaced pictures to be displayed having 480 scanning lines (interlaced pictures having scanning lines to be displayed) are output via an output terminal 50.

Figure 7:
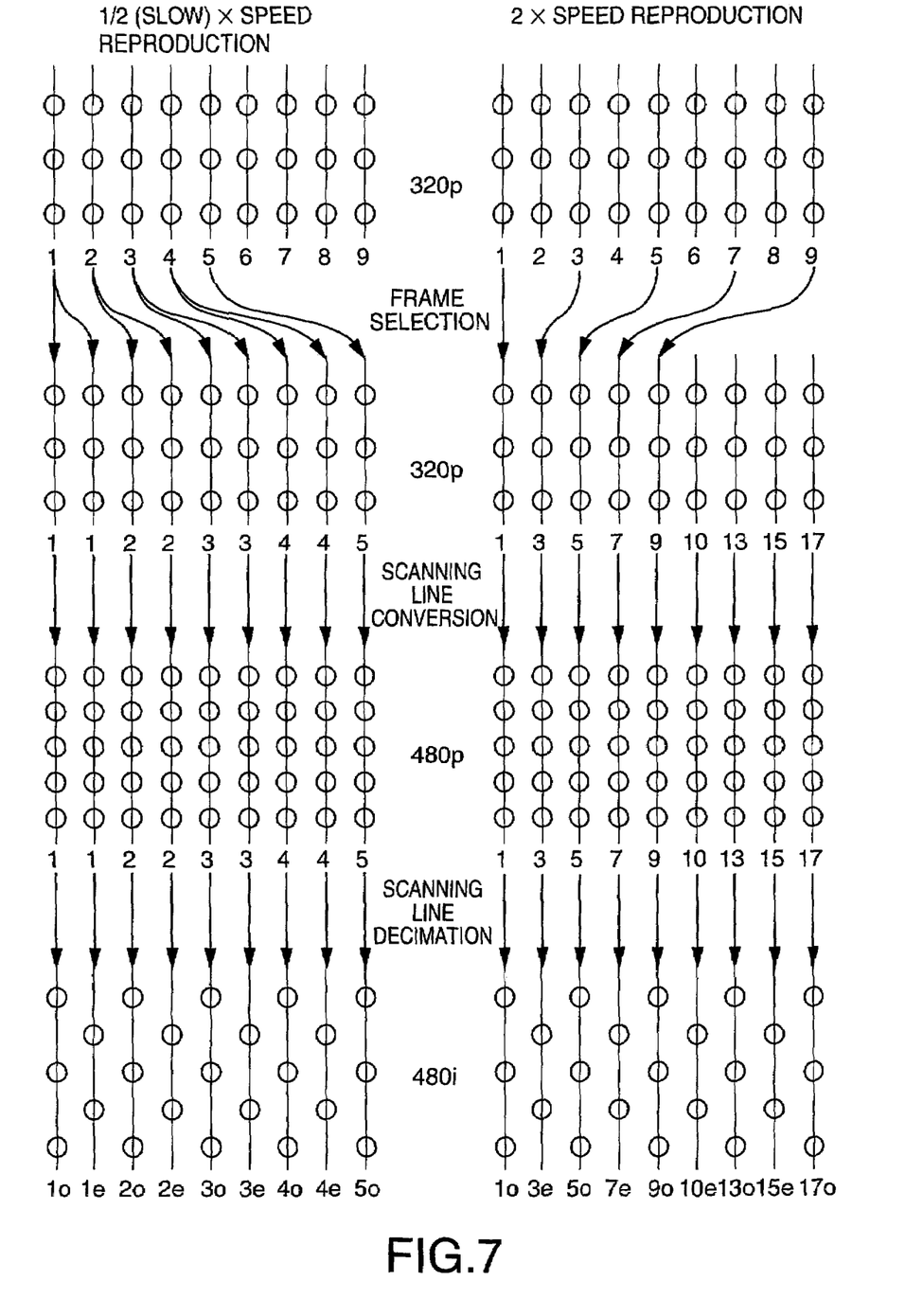
FIG. 7 illustrates change in scanning lines in variable-speed reproduction according to the fourth embodiment of the present invention.

Illustrated in FIG. 7 is change in the number of scanning lines in the fourth embodiment. The mark "○" indicates the scanning lines.

Frame selection at the frame selector 20 is performed such that a frame of the progressive pictures from the decoder 10 is selected twice or more in succession at the set speed slower than the regular reproduction speed whereas several frames of the progressive pictures are decimated at the set speed higher than the regular speed.

For example, one frame is selected twice in succession at ½× speed reproduction whereas one of two consecutive frames is selected at 2× speed reproduction.

As disclosed, the fourth embodiment performs scanning-line conversion from 320p to 480p with decimation of scanning lines from 480p at a constant interval to generate the interlaced pictures to be displayed having 480 (480i) scanning lines.

Fifth Embodiment

Figure 8:
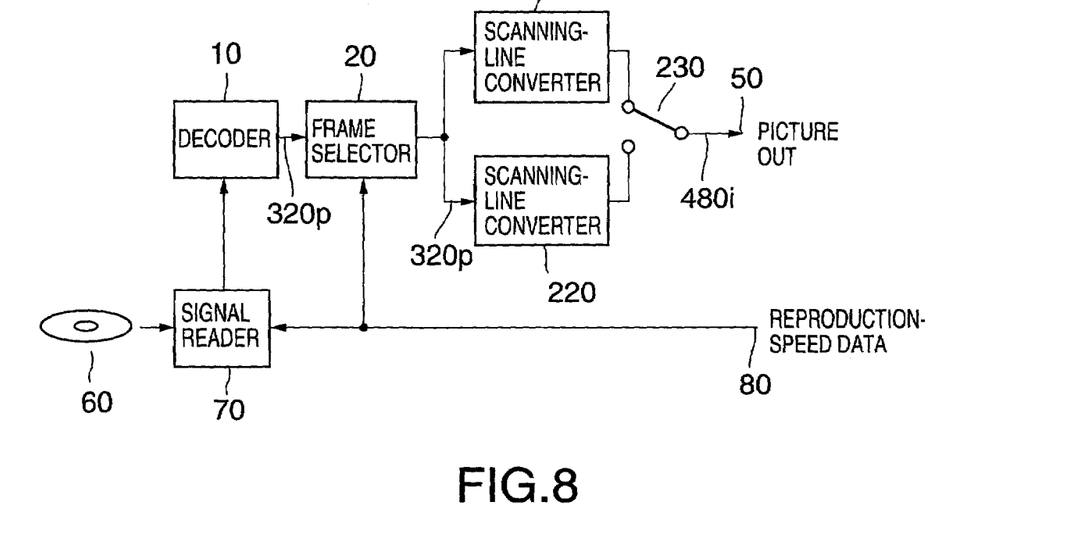
FIG. 8 is a block diagram of a fifth embodiment of variable-speed reproduction apparatus according to the present invention.

Disclosed next with reference to FIG. 8 is the fifth embodiment of variable-speed reproduction apparatus according to the present invention.

Elements in this embodiment that are the same as or analogous to the elements in the fourth embodiment are referenced by the same reference numbers and will not be explained in detail.

The variable-speed reproduction apparatus in the fifth embodiment is equipped with a scanning-line converters 210 and 220 and a switch 230 instead of the scanning-line converter 30 and the scanning-line decimator 40 (FIG. 6).

The difference in operation of the fifth embodiment from the fourth embodiment is to obtain each filed of interlaced pictures having 480 (480i) scanning lines to be displayed directly from progressive pictures (selected progressive pictures to be displayed) having 320 (320p) scanning lines without producing progressive pictures having 480 (480p) scanning lines.

Progressive pictures (selected progressive pictures to be displayed) having 320 (320p) scanning lines produced at the frame selector 20 are supplied to the scanning-line converters 210 and 220.

Figure 9:
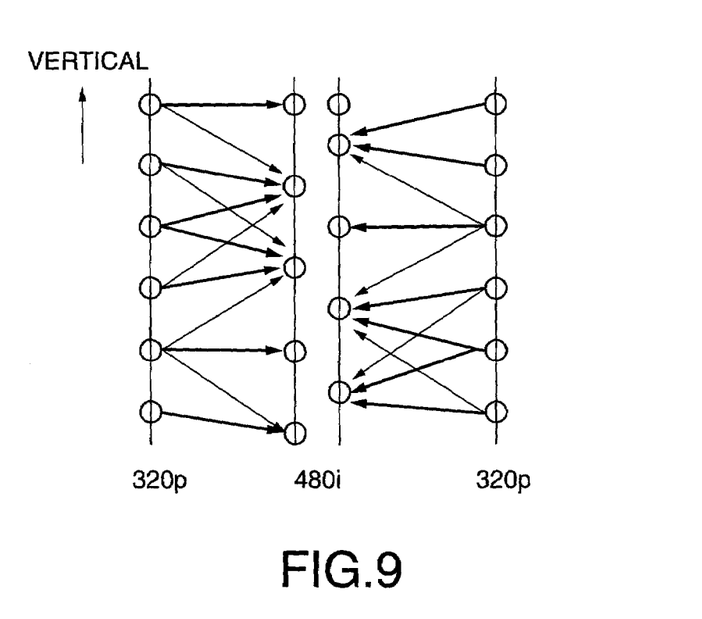
FIG. 9 illustrates change in scanning lines in variable-speed reproduction according to the fifth embodiment of the present invention.

Each frame of the progressive pictures having 320 scanning lines are converted into an odd field and an even field by the scanning-line converters 210 and 220, respectively, for interlaced pictures to be displayed having 480 (480i) scanning lines (scanning lines to be displayed). Change in the number of scanning lines in the fifth embodiment is illustrated in FIG. 9. The number of scanning lines of each field is 240. The scanning-line converters 210 and 220 have a resampling filer with a filtering coefficient of the frequency characteristics of 360 scanning lines, not for downsampling. Such resampling filtering causes residual aliasing components which, however, will not affect production of interlaced pictures.

The output of the scanning-line converters 210 and 220 are supplied to the switch 230. The switch 230 selects the output of the scanning-line converter 210 for odd fields whereas the output of the scanning-line converter 220 for even fields in synchronism with an interlaced-picture format to be displayed. The interlaced pictures having 480 (480i) scanning lines to be displayed produced through the switch 230 are output via an output terminal 50.

As disclosed above, according to the first concept of the present invention, interlaced pictures are reproduced from a moving-picture signal stored in a storage medium and once converted into progressive pictures, for outputting interlaced moving pictures to be displayed at a speed different from a regular reproduction speed (variable-speed reproduction).

The progressive pictures carry even and odd fields of interlace pictures. Conversion of the progressive pictures in accordance with an output interlaced-picture format thus achieves a normal parity for output interlaced pictures at any reproduction speed (variable-speed reproduction).

Moreover, according to the present invention, interlaced pictures are reproduced from a moving-picture signal stored in a storage medium and interpolated interlaced pictures are produced from the reproduced interlaced pictures, for outputting interlaced moving pictures at the variable-speed reproduction.

The interlaced pictures and the interpolated interlaced pictures have a reverse parity with each other. Selection of either the interlaced pictures or the interpolated interlaced pictures that match the output picture format also achieves a normal parity for output interlaced pictures at the variable-speed reproduction.

Interlaced pictures reproduced from the moving-picture signal can be output as they are with no processing as explained above in a regular-speed (1× speed) reproduction.

Therefore, the present invention according to the first concept delivers interlaced pictures to be displayed having a normal parity with al most no picture degradation such as low image resolution, aliasing and vertical image vibration.

Moreover, as disclosed above, according to the second concept of the present invention, progressive pictures are reproduced from a moving-picture signal stored in a storage medium in accordance with a set reproduction speed, for outputting interlaced moving pictures to be displayed at a speed different from a regular reproduction speed (variable-speed reproduction).

The number of scanning lines of the reproduced progressive pictures is converted to be equal to the number of scanning lines for an output interlaced-picture format to be displayed if different, for obtaining final interlaced pictures to be displayed.

Conversion of the number of scanning lines is applied to progressive moving pictures, thus causing no problems such as reversion of even and odd fields for interlaced moving pictures.

Therefore, the present invention according to the second concept also delivers interlaced pictures to be displayed having a normal parity with almost no picture degradation such as low image resolution, aliasing and vertical image vibration.

What is claimed is:

1. An apparatus for reproducing moving pictures from a stored moving-picture signal and outputting the moving pictures at a set reproduction speed that is a first reproduction speed matching a rate of motion of the moving pictures or a second reproduction speed different from the first reproduction speed, the apparatus comprising:

a reproducer to reproduce the stored moving-picture signal in accordance with the set reproduction speed for obtaining first interlaced pictures;

a progressive scanning converter to convert the first interlaced pictures for obtaining first progressive pictures;

a picture selector to select moving pictures to be displayed from the first progressive pictures per frame in accordance with the set reproduction speed for obtaining second progressive pictures; and a scanning-line decimator to decimate scanning lines of the second progressive pictures so that the number of remaining scanning lines of the second progressive pictures after decimation is equal to the number of scanning lines of interlace pictures to be displayed, thus outputting second interlaced pictures, wherein the first interlaced pictures are output when the set reproduction speed is the first reproduction speed whereas the second interlaced pictures are output when the set reproduction speed is the second reproduction speed.

2. A method of reproducing moving pictures from a stored moving-picture signal and outputting the moving pictures at a set reproduction speed that is a first reproduction speed matching a rate of motion of the moving pictures or a second reproduction speed different from the first reproduction speed, the method comprising the steps of:

reproducing the stored moving-picture signal in accordance with the set reproduction speed for obtaining first interlaced pictures;

converting the first interlaced pictures for obtaining first progressive pictures;

selecting moving pictures to be displayed from the first progressive pictures per frame in accordance with the set reproduction speed for obtaining second progressive pictures;

decimating scanning lines of the second progressive pictures so that the number of remaining scanning lines of the second progressive pictures after decimation is equal to the number of scanning lines of interlaced pictures to be displayed, thus outputting second interlaced pictures; and outputting the first interlaced pictures when the set reproduction speed is the first reproduction speed whereas outputting the second interlaced pictures when the set reproduction speed is the second reproduction speed.

* * * * *